United States Patent
Parsche et al.

(10) Patent No.: US 11,353,537 B2
(45) Date of Patent: Jun. 7, 2022

(54) LORAN DEVICE WITH INTERFERENCE CANCELLATION AND INTERFERENCE CANCELLER DEVICE WITH RELATED METHODS

(71) Applicant: EAGLE TECHNOLOGY, LLC, Melbourne, FL (US)

(72) Inventors: Francis E. Parsche, Palm Bay, FL (US); Kenneth J. Hendrickson, Melbourne, FL (US); William C. Adams, Jr., West Melbourne, FL (US)

(73) Assignee: EAGLE TECHNOLOGY, LLC, Melbourne, FL (US)

( * ) Notice: Subject to any disclaimer, the term of this patent is extended or adjusted under 35 U.S.C. 154(b) by 556 days.

(21) Appl. No.: 16/400,321

(22) Filed: May 1, 2019

(65) Prior Publication Data

US 2020/0350938 A1     Nov. 5, 2020

(51) Int. Cl.
*G01S 1/24*     (2006.01)
*H04B 1/10*     (2006.01)

(52) U.S. Cl.
CPC ............ *G01S 1/245* (2013.01); *H04B 1/1027* (2013.01)

(58) Field of Classification Search
CPC ... G01S 1/24; G01S 1/245; G01S 1/04; G01S 1/045; G01S 5/0215; G01S 5/0218; G01S 5/02; G01S 5/0221; G01S 5/14; G01S 5/0027; H04B 1/1027
See application file for complete search history.

(56) References Cited

U.S. PATENT DOCUMENTS

| | | | |
|---|---|---|---|
| 3,916,320 A | * | 10/1975 | Roll ........................ G01S 1/245 455/304 |
| 4,791,422 A | | 12/1988 | Goddard |
| 4,800,391 A | | 1/1989 | Enge |
| 4,804,964 A | | 2/1989 | Takai et al. |

(Continued)

FOREIGN PATENT DOCUMENTS

| EP | 2086219 | 8/2009 |
|---|---|---|
| EP | 2237455 | 10/2010 |

(Continued)

OTHER PUBLICATIONS

U.S. Appl. No. 16/375,069, filed Jun. 20, 2018 Parsche et al.
(Continued)

*Primary Examiner* — Cassi J Galt
(74) *Attorney, Agent, or Firm* — Allen, Dyer, Doppelt + Gilchrist, P.A.

(57) ABSTRACT

A LORAN device may include a LORAN antenna, a LORAN receiver, an RF signal path extending between the LORAN antenna and the LORAN receiver and being subject to ambient RF interference, and an ambient RF interference canceller coupled in the RF signal path. The ambient RF interference canceller may include an ambient RF interference sensor configured to generate an estimated ambient RF interference signal based on the sensed ambient RF interference, and cancellation circuitry configured to cooperate with the ambient RF interference sensor to generate an ambient RF interference cancellation signal based upon the sensed ambient RF interference signal, and add the ambient RF interference cancellation signal to the RF signal path.

20 Claims, 11 Drawing Sheets

(56) References Cited

U.S. PATENT DOCUMENTS

| | | |
|---|---|---|
| 4,812,851 A | 3/1989 | Giubardo |
| 4,814,771 A | 3/1989 | Bahr et al. |
| 4,821,038 A | 4/1989 | Enge |
| 4,875,019 A | 10/1989 | Monson et al. |
| 4,888,594 A | 12/1989 | Sundquist et al. |
| 4,999,638 A | 3/1991 | Schick |
| 5,032,845 A | 7/1991 | Velasco |
| 5,105,196 A | 4/1992 | Nolan et al. |
| 5,181,041 A | 1/1993 | Lind et al. |
| 5,220,333 A | 6/1993 | Penrod |
| 5,278,568 A | 1/1994 | Enge et al. |
| 5,563,611 A | 10/1996 | McGann et al. |
| 5,796,366 A | 8/1998 | Grebnev et al. |
| 6,108,524 A | 8/2000 | Hershey et al. |
| 6,452,547 B1 | 9/2002 | Johannessen |
| 6,539,306 B2 | 3/2003 | Turnbull |
| 6,928,265 B2 | 8/2005 | Johannessen |
| 7,778,367 B1 * | 8/2010 | Stockmaster ......... G01S 5/0215 375/347 |
| 7,782,983 B2 | 8/2010 | Parakh et al. |
| 7,876,259 B2 | 1/2011 | Schuchman |
| 8,238,863 B2 | 8/2012 | Farmer et al. |
| 8,781,429 B2 | 7/2014 | Bornazyan |
| 9,071,343 B2 | 6/2015 | Abdelmonem |
| 9,100,081 B2 * | 8/2015 | Hirano ................. H04B 15/005 |
| 9,124,336 B2 | 9/2015 | Leyh et al. |
| 9,215,012 B2 | 12/2015 | Holder et al. |
| 9,948,452 B1 | 4/2018 | Pearson et al. |
| 2005/0259723 A1 | 11/2005 | Blanchard |
| 2006/0211389 A1 | 9/2006 | Lin et al. |
| 2010/0253851 A1* | 10/2010 | Itou ....................... H04B 1/525 348/607 |
| 2011/0086609 A1 | 4/2011 | Buehler et al. |
| 2011/0319044 A1 | 12/2011 | Bornazyan |
| 2012/0309341 A1 | 12/2012 | Ward |
| 2013/0293421 A1 | 11/2013 | Bartone |
| 2014/0269850 A1 | 9/2014 | Abdelmonem et al. |
| 2015/0257036 A1 | 9/2015 | Abdelmonem |
| 2017/0302332 A1 | 10/2017 | Abdelmonem et al. |
| 2019/0377055 A1* | 12/2019 | Offermans ............ H04W 12/02 |

FOREIGN PATENT DOCUMENTS

| | | |
|---|---|---|
| EP | 2549656 | 1/2013 |
| JP | 2011199466 | 10/2011 |

OTHER PUBLICATIONS

U.S. Appl. No. 16/375,069, filed May 16, 2018 Parsche et al.
U.S. Appl. No. 16/375,069, filed Apr. 3, 2019 Parsche et al.
U.S. Appl. No. 16/419,568, filed May 22, 2019 Francis E. Parsche.

* cited by examiner

LORAN DEVICE WITH INTERFERENCE CANCELLATION AND INTERFERENCE CANCELLER DEVICE WITH RELATED METHODS

TECHNICAL FIELD

The present disclosure relates to the field of navigation and communication systems, and, more particularly, interference reduction and related methods.

BACKGROUND

LORAN is a legacy pulse based hyperbolic navigation system. The related eLORAN is modernized pulse based navigation system that includes many enhancements. eLORAN may include a data channel, which conveys corrections for propagation anomalies. eLORAN may also include improved transmit timing, time of arrival rather than time difference of arrival features, and other new aspects.

With the rise of satellite based navigation systems, such as the Global Positioning System (GPS), there has been relatively little development or investment in terrestrial-based navigation systems, such as eLORAN, until recently. A renewed interest in such systems has arisen as a backup to satellite navigation systems, particularly since low frequency eLORAN signals are less susceptible to jamming or spoofing compared to the relatively higher frequency GPS signals. As such, further developments in eLORAN reception may be desirable in certain applications.

The preferred 100 kHz frequencies of eLORAN, that support ground wave propagation, can be prone to electromagnetic interference (EMI) from the accessories of man. As such EMI may be caused by automobile ignition systems, automobile alternators, powerline faults, switching power supplies, neon signs and others. It is important that practical eLORAN navigation receivers be able to operate in EMI environments. EMI may have a strong electric field (E field) component, and that strong E field EMI component is typically vertically polarized. Some EMI may be pulse like in nature. As well, EMI may comprise conducted electric currents conveyed on power conductors, such as vehicle DC connections or wall AC outlet connections. Further, ground connections may carry EMI currents.

Differently from EMI, nature may provide sources of noise in the electromagnetic spectrum. At the 100 kHz preferred eLORAN frequency lightning is significant source of natural noise.

eLORAN systems may operate on many platforms and their reliable function is critical to safety of life at sea, in the air, and on land. As such, it is important to be able to mitigate electromagnetic interference in an eLORAN receiver. Given the importance of dependable eLORAN operation, means to eliminate electromagnetic interference are needed.

SUMMARY

Generally, a LORAN device may include a LORAN antenna, a LORAN receiver, an RF signal path extending between the LORAN transmitter antenna and a LORAN receiver that may be subject to ambient RF interference, and an ambient RF interference canceller coupled in the RF signal path. The ambient RF interference canceller may comprise an ambient RF interference sensor configured to generate a sensed ambient RF interference signal based on the ambient RF interference, and cancellation circuitry. The cancellation circuitry may be configured to cooperate with the ambient RF interference sensor to generate an ambient RF interference cancellation signal based upon the sensed ambient RF interference signal, and add the ambient RF interference cancellation signal to the RF signal path.

More specifically, the ambient RF interference sensor may comprise an ambient RF interference antenna. The LORAN device may also comprise a housing containing the LORAN receiver and an RF interference generating component also contained with the housing. The ambient RF interference antenna may be positioned adjacent to the RF interference generating component. In some embodiments, the LORAN device may further comprise power supply lines coupled to the LORAN receiver, and the ambient RF interference sensor may comprise a power signal sensor coupled to the power supply lines.

Additionally, the cancellation circuitry may be configured to generate a plurality of channel weights for a LORAN receive signal, and a plurality of interference weights for the sensed ambient RF interference signal, and generate the ambient RF interference cancellation signal based upon the plurality of channel weights and the plurality of interference weights. The cancellation circuitry may be configured to generate the plurality of channel weights and the plurality of interference weights by at least generating an estimated inverse covariance matrix. The cancellation circuitry may be configured to generate the plurality of channel weights and the plurality of interference weights during a LORAN pulse signal space period in the LORAN received signal.

Also, the cancellation circuitry may be configured to generate the ambient RF interference cancellation signal by at least performing an adaptive filter process. The sensed ambient RF interference signal may include a spectral component outside a frequency range of a LORAN receive signal. The LORAN device may further comprise a low pass filter coupled in the RF signal path.

Another aspect is directed to an ambient RF interference canceller device for a LORAN device comprising a LORAN antenna, a LORAN receiver, an RF signal path extending between the LORAN antenna and the LORAN receiver and being subject to ambient RF interference. The ambient RF interference canceller device may include an ambient RF interference sensor configured to generate a sensed ambient RF interference signal based on the ambient RF interference, and cancellation circuitry. The cancellation circuitry may be configured to cooperate with the ambient RF interference sensor to generate an ambient RF interference cancellation signal based upon the sensed ambient RF interference signal, and add the ambient RF interference cancellation signal to the RF signal path.

Yet another aspect is directed to a method for operating a LORAN device comprising a LORAN antenna, a LORAN receiver, an RF signal path extending between the LORAN antenna and the LORAN receiver and being subject to ambient RF interference, and an ambient RE interference canceller coupled in the RF signal path. The method may include operating an ambient RF interference sensor in the ambient RF interference canceller to generate a sensed ambient RF interference signal based on the ambient RF interference. The method also may comprise operating cancellation circuitry in the ambient RF interference canceller to cooperate with the ambient RF interference sensor to generate an ambient RF interference cancellation signal based upon the sensed ambient RF interference signal, and add the ambient RF interference cancellation signal to the RF signal path.

DETAILED DESCRIPTION

Figure 1:
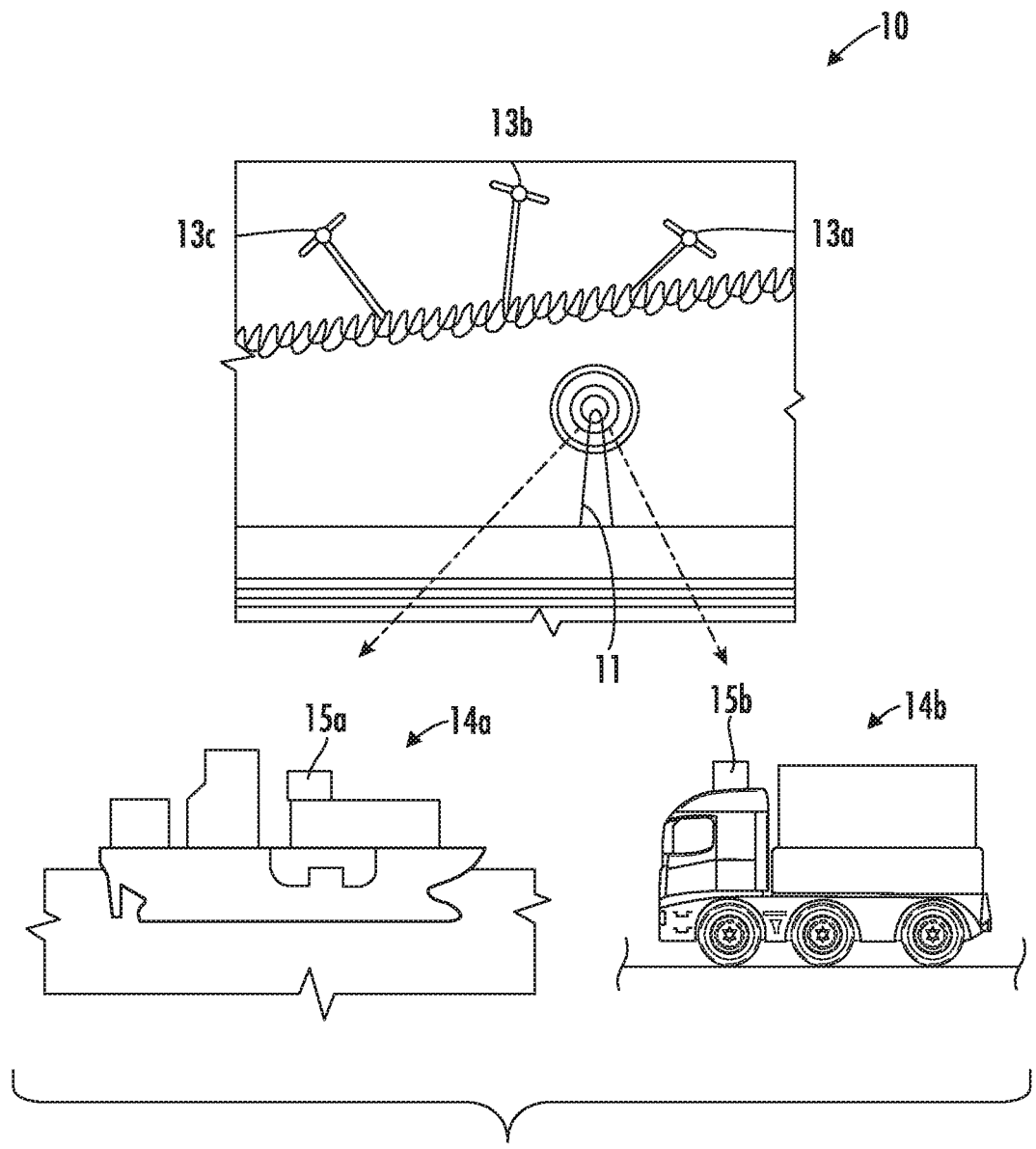
FIG. 1 is a schematic diagram of a LORAN communication system, according to the present disclosure.

The present disclosure will now be described more fully hereinafter with reference to the accompanying drawings, in which several embodiments of the present disclosure are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and base 100 reference numerals are used to indicate similar elements in alternative embodiments.

Figure 2:
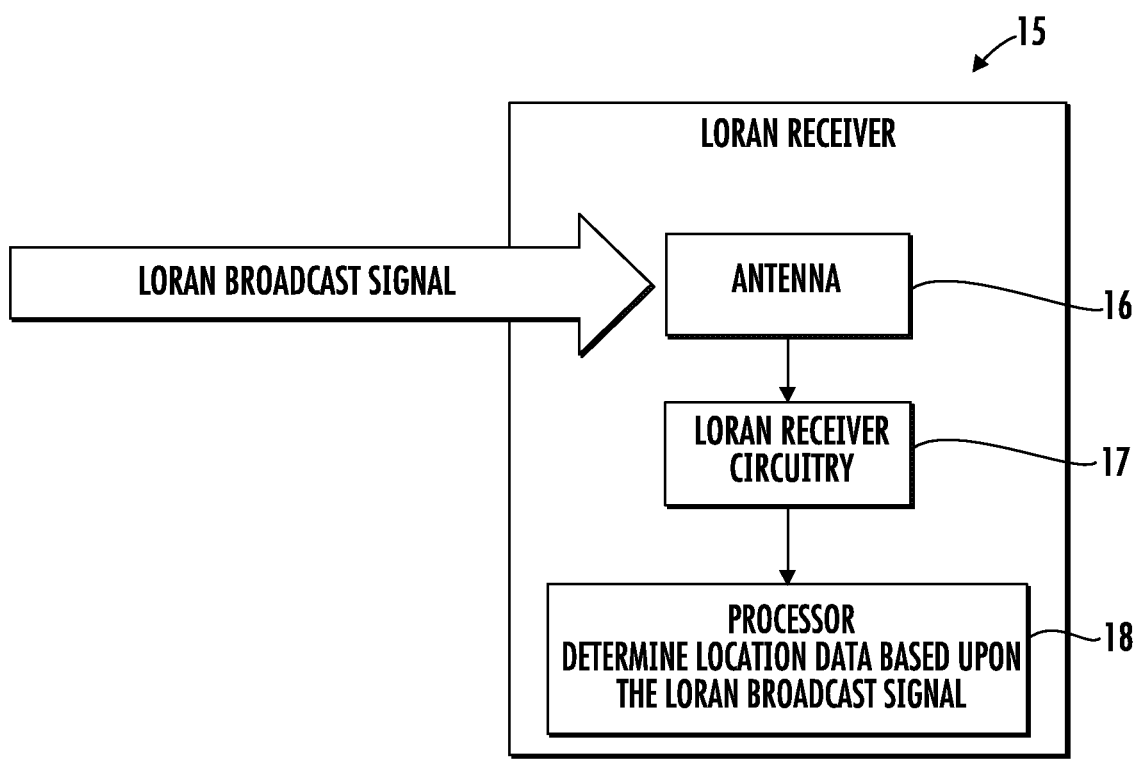
FIG. 2 is a LORAN receiver from the LORAN communication system of FIG. 1.
Figure 3:
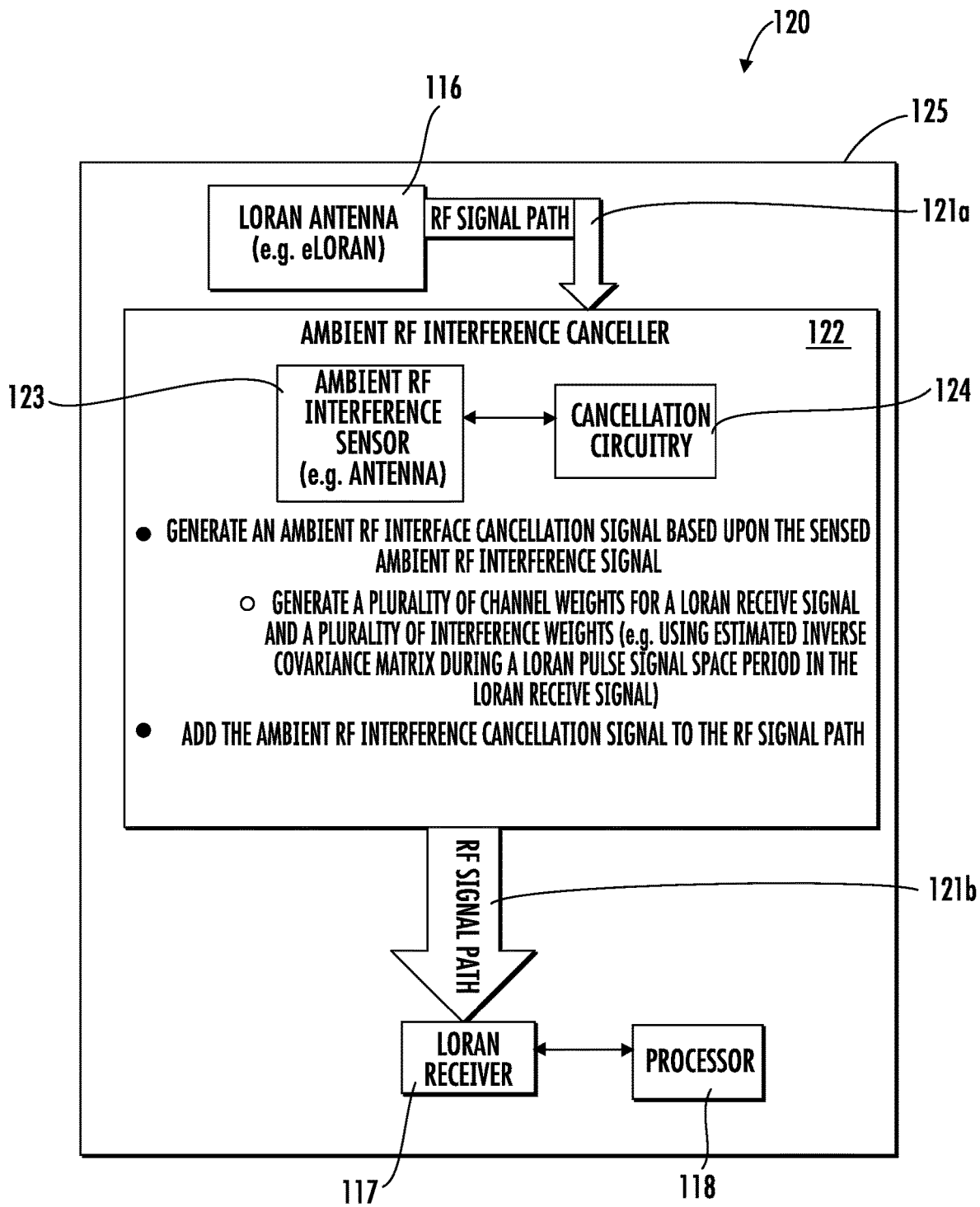
FIG. 3 is a LORAN device, according to a first embodiment of the present disclosure.

Referring initially to FIGS. 1-3, a LORAN navigation and communication system 10, according to the present disclosure, is now described. The present invention LORAN navigation and communication system 10 may provide a rejection of unwanted electromagnetic interference. The LORAN navigation and communication system 10 illustratively includes a LORAN broadcast station 11 configured to transmit a LORAN broadcast signal.

Although not part of the LORAN communication system 10, a plurality of GPS satellites 13a-13c is depicted. It should be appreciated that due to the low power and high frequency nature of GPS signals from the plurality of GPS satellites 13a-13c, the respective GPS signals are readily subject to natural and man-made interference (e.g. spoofing, jamming). Because of this, it is helpful to provide the LORAN navigation and communication system 10 as detailed herein.

The LORAN navigation communication system 10 illustratively includes a plurality of vehicles 14a-14b. In the illustrated embodiment, the plurality of vehicles 14a-14b illustratively includes a watercraft 14a, and a land based vehicle 14b. Each of the plurality of vehicles 14a-14b illustratively includes a LORAN receiver 15a-15b configured to receive and process the LORAN broadcast signal.

Each LORAN receiver 15a-15b illustratively includes one or more antennas 16 and LORAN receiver circuitry 17 coupled thereto. The LORAN receiver 15a-15b illustratively includes a processor 18 coupled to the LORAN receiver circuitry 17 and configured to determine position/location data based upon the LORAN broadcast signal. It is understood that the term antenna 16 can include an EMI sensing device purposefully directed to sensing EMI in preference to the desired eLORAN signal.

As will be appreciated by those skilled in the art, the antenna 16 can be an H-field antenna, an E-field antenna, or both. E-field antennas have a strong response to electric fields, and H-field antennas have a strong response to magnetic fields. Also, H-field antennas are closed electrical circuit loops, and E-field antennas are open electrical circuits such as whips.

As will be appreciated, in this exemplary implementation of the LORAN communication system 10, the application comprises a controlled electromagnetic interference (EMI) environment. Typically, the LORAN receiver 15a-15b is modular and spaced apart from potential EMI sources.

For the reasons noted herein, there may be a desire to deploy LORAN systems in multi-function devices, such as a mobile cellular device or a small land vehicle. In these applications, the LORAN receiver 15a-15b may be collocated with or even integrated with EMI sources. Even more, these applications may be located in urban areas (i.e. near a large number of EMI sources), rather than the seas or remote land destination of the LORAN communication system 10.

Referring now to FIG. 3, a LORAN device 120 according the present disclosure is now described, and may provide an approach to the above issues. As will be appreciated, the LORAN device 120 may comprise one or more of an eLORAN device, a LORAN-A device, and a LORAN-C device, for example. In other words, any LORAN standard could be used with the teachings disclosed herein. It is understood that the terms LORAN and eLORAN may be used interchangeably in the context, specification, and claims of the present patent application.

The LORAN device 120 illustratively includes a LORAN antenna 116, a LORAN receiver 117, and an RF signal path 121a-121b extending between the LORAN antenna and the LORAN receiver and being subject to ambient RF interference. For example, the sources for the ambient RF interference (i.e. the source of EMI) may comprise one or more of a processing unit, a vehicle alternator, a sparkplug ignition, a switching power supply oscillator, a powerline fault, a motor commutator, a windshield wiper electric motor, an air conditioning motor, a lighting device, and a display. In particular, the vehicle alternators may generate powerful EMI (commonly referred to alternator whine) in the 100 kHz spectrum of LORAN.

The LORAN device 120 illustratively comprises an ambient RF interference canceller 122 coupled in the RF signal path 121a-121b. The ambient RF interference canceller 122 comprises an ambient RF interference sensor 123 configured to generate a sensed ambient RF interference signal based on the ambient RF interference, and cancellation circuitry 124. The ambient RF interference sensor 123 may comprise an antenna and associated receive path in some embodiments. The ambient RF interference sensor 123 may comprise a current transformer, or an E-field antenna proximate the vehicle alternator.

Additionally or alternatively, the ambient RF interference sensor 123 may comprise near field or conductive sensors. Of course, in yet other embodiments, the ambient RF interference sensor 123 comprises a plurality thereof comprising a diverse combination of ambient RF interference sensors of differing types.

The cancellation circuitry 124 is configured to cooperate with the ambient RF interference sensor 123 to generate an ambient RF interference cancellation signal based upon the sensed ambient RF interference signal, and add the ambient RF interference cancellation signal to the RF signal path 121a-121b (i.e. the second portion 121b). That is, the cancellation circuitry 124 is configured to execute an interference cancellation algorithm to generate a signal that cancels out the ambient RF interference in the LORAN receive signal.

Figure 4:
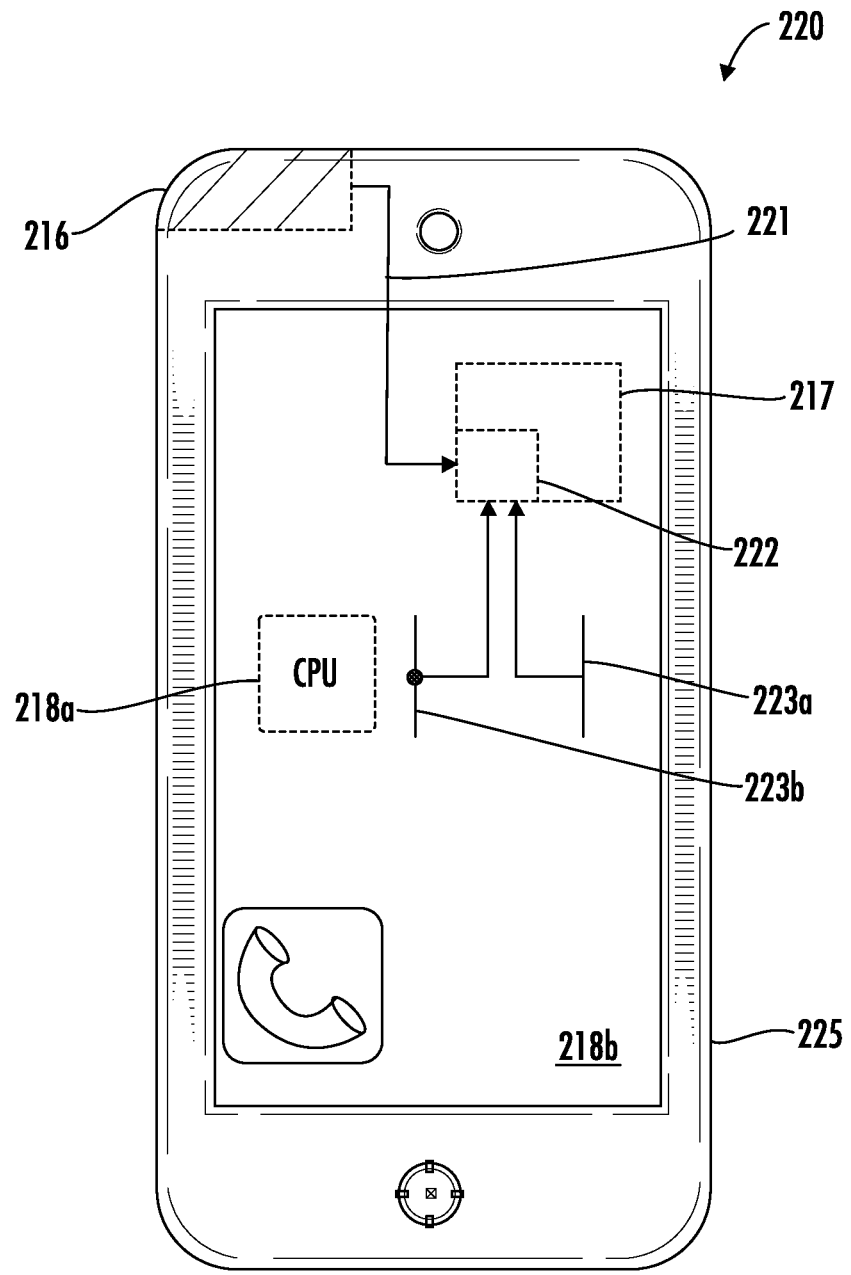
FIG. 4 is a LORAN device, according to a second embodiment of the present disclosure.

The LORAN device 120 illustratively comprises a housing 125 containing the LORAN receiver 117 and an RF interference generating component 118 (e.g. the illustrated processor) also contained with the housing. In this embodiment, the LORAN device 120 comprises a common housing for the components therein. In some applications, the components may comprise a common circuit board (FIG. 4).

In other embodiments, the ambient RF interference canceller 122 may comprise an individual housing for plug-and-play operation with a large number of LORAN devices (i.e. a black box package). In these applications, the ambient RF interference canceller 122 would include an output for coupling to the LORAN receiver 117, and a plurality of inputs to be coupled to the LORAN antenna 116, and other external ambient RF interference sensors (not shown).

Additionally, the cancellation circuitry 124 is configured to generate a plurality of channel weights for a LORAN receive signal, and a plurality of interference weights for the sensed ambient RF interference signal, and generate the ambient RF interference cancellation signal based upon the plurality of channel weights and the plurality of interference weights. The cancellation circuitry 124 is configured to generate the plurality of channel weights and the plurality of interference weights by at least generating an estimated inverse covariance matrix.

Of course, due to the computational cost of actually inverting a matrix, the process for calculating an estimated inverse covariance matrix may comprise a different calculation approximating the actual inverse covariance matrix with a reduced computational cost. In some embodiment where processing power is no limited, the process for calculating an estimated inverse covariance matrix may comprise calculating the actual inverse covariance matrix as an alternative.

Also, the cancellation circuitry 124 is configured to generate the plurality of channel weights and the plurality of interference weights during a LORAN pulse signal space period in the LORAN receive signal. Helpfully, the cancellation circuitry 124 uses the silent periods in LORAN pulse signal space to more accurately determine the ambient RF interference cancellation signal, thereby reducing self-interference from the LORAN signal.

Figure 6:
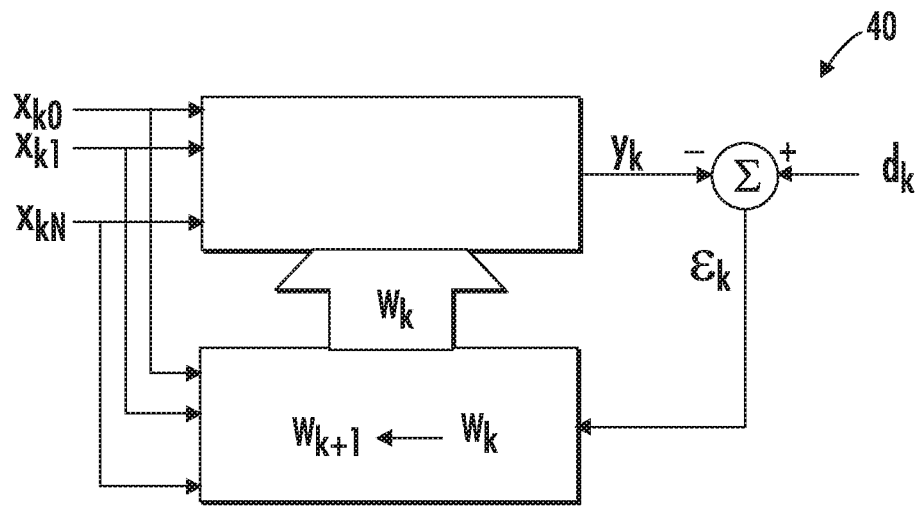
FIG. 6 is a schematic diagram of an adaptive filter method used in the ambient RF interference canceller, according to the present disclosure.
Figure 7:
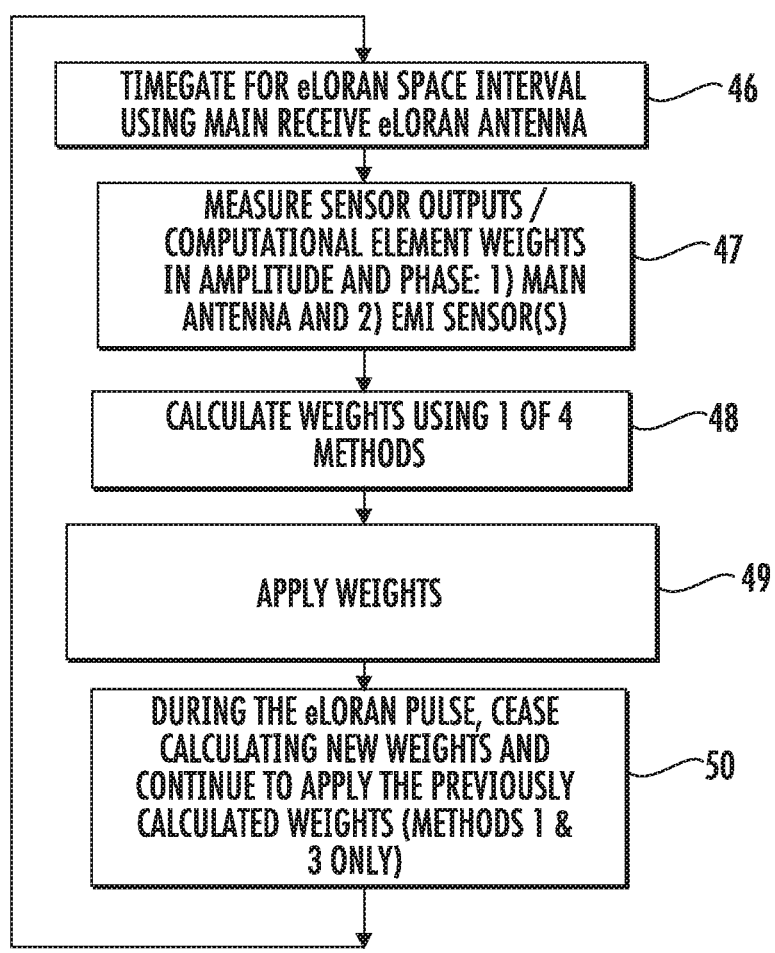
FIG. 7 is a flowchart of an interference cancellation method used in the ambient RF interference canceller, according to the present disclosure.

Referring now briefly and additionally to FIGS. 6-7, as illustrated in diagram 40, the cancellation circuitry 124 is configured to generate the ambient RF interference cancellation signal by at least performing an adaptive filter process. In some embodiments, the adaptive filter process may comprise a finite impulse response (FIR) filter process.

Again, with reference to the diagram 40, $d_k$ is the LORAN antenna signal at time k. $X_k$ is an interference antenna signal at time k. In some embodiments, there may be one such adaptive filter for every interference source x.

At each time slice k, every filter coefficient $W_k$ is re-calculated, by a least mean squares (LMS) gradient descent method. The direction that minimizes $\varepsilon_k$, for each change in $W_k$ is followed to arrive at a new weight $W_{k+1}$, moving only partially down the hill. After enough steps, $W_k$ may be optimum, and the new calculated $W_{k+1}$ is not significantly different from $W_k$.

The above steps are done for every adaptive filter, and there is one adaptive filter for each interference source. In some embodiments, the above steps are performed for all time slices k. In other embodiments, the above steps are performed for only the time slices k where a LORAN pulse is not present.

In some embodiments, the interference cancellation algorithm may include a delay buffer to preserve position information. The interference cancellation algorithm would be applied to the delayed version of the LORAN signal, and this does not matter as the signals from all LORAN towers are delayed by an identical amount.

The sensed ambient RF interference signal may have a bandwidth greater than, the same as, and/or even narrower than that of a LORAN receive signal. Also, the sensed ambient RF interference signal may have spectral components outside and/or inside the frequency band of the LORAN receive signal. In a flowchart 45, a method for preconditioning the channel array to reject co-channel interference is now described, with reference to Table 1 below.

At block 46, the method uses a time gating method to determine the LORAN pulse signal space period for using the LORAN antenna 116. The method includes measuring the output of the ambient RF interference sensor 123. (Block 47). The method also includes calculating the plurality of channel weights and the plurality of interference weights using one of the four options from Table 1. (Block 48). The method comprises applying the weights, i.e. the generating of the ambient RF interference cancellation signal based upon the plurality of channel weights and the plurality of interference weights. (Block 49). The method comprises ceasing of calculation of new weights during the LORAN pulse. (Block 50).

TABLE 1

| Calculate Weights | Adaptive Filter Process | Covariance Matrix Process |
|---|---|---|
| Freeze weights during eloran pulses | Option 1 | Option 3 |
| Always calculate | Option 2 | Option 4 |

The generating of the estimated inverse covariance matrix includes the following. The covariance matrix is first sampled: $R_{vv}=vv^H$. The most recent M covariance matrix samples are averaged together $R_{vv}$ to obtain covariance matrix estimate, where v is a vector of signal interference samples:

$$\hat{R}_{vv} = \frac{1}{M}\sum_M vv^H.$$

For constraints C, the plurality of weights are calculated as:

$$\hat{R}_{vv}^{-1}C(C^H\hat{R}_{vv}^{-1}C)^{-1}.$$

In this case, $C=\{1, 0, \ldots, 0\}^T$ because only the LORAN receive signal is desired.

As part of the interference cancellation algorithm, the ambient RF interference canceller 122 is configured to correlate the interference sensor signal and the LORAN receive signal by adaptive weight setting using a cost correlation function to drive the direction of gradient descent between the interference source and the summer output. Also, the correlating the interference sensor signal and LORAN antenna signal may be accomplished by minimizing the total power at the summer output.

In some embodiments, the cancellation circuitry 124 is configured to generate a plurality of channel weights for a LORAN receive signal, and a plurality of interference weights for the sensed ambient RF interference signal, which is done all in real-time, or contemporaneously during operation of the LORAN device 120. In some embodiments, the cancellation circuitry 124 is configured to generate the aforementioned weights at least partially based upon a priori values. These a priori values would relate to self-interference sources, such as, for example, the processor, and the display. These a priori values would likely be factory tested and determined as part of the interference cancellation algorithm. These a priori values would be combined with the real-time value mentioned earlier in some embodiments. In some embodiments, the a priori values could be used exclusively, i.e. no real-time computations, and in other embodiments, the a priori values could be excluded, i.e. only using real-time computational values.

Figure 11A:
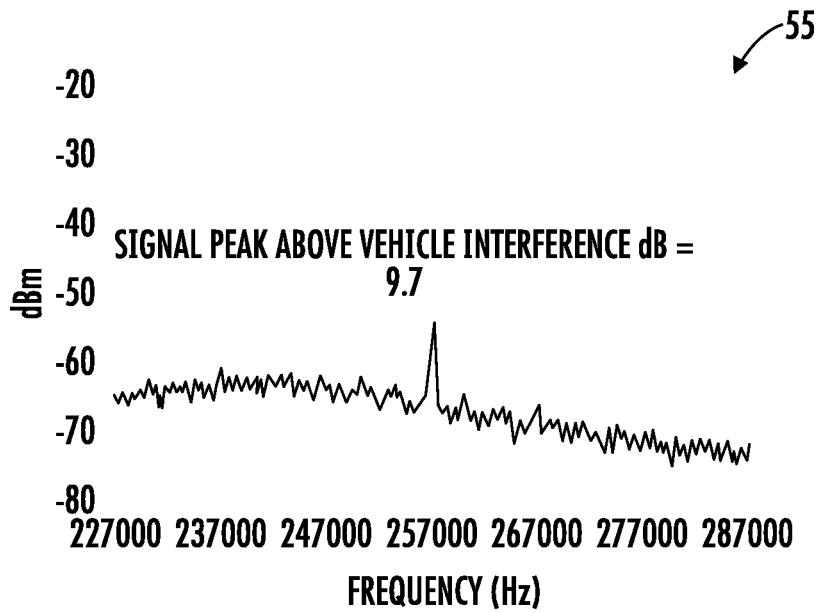
FIGS. 11A and 11B are diagrams of signal strength in LORAN devices, according to the prior art and embodiments of the present disclosure, respectively.
Figure 11B:
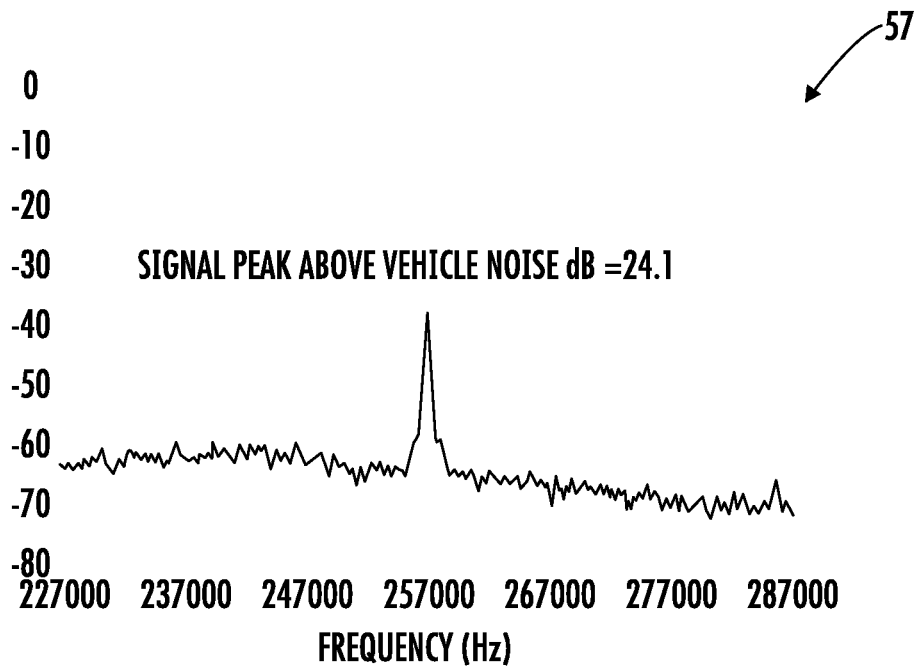

Referring briefly and additionally to FIGS. 11A-11B, diagrams 55, 57 include data from an exemplary implementation of the LORAN device 120 (including the interference function) and a typical LORAN device without the teachings disclosed herein. Experimental measurements were made for a broadcast LF signal 257 kHz beacon signal with an adjacent vehicle running, using an H-field signal antenna. In the typical LORAN device, the signal peak above the vehicle interference is 9.7 dB. With the LORAN device 120 which employs the interference cancellation technique described herein, the signal peak above the vehicle interference is 24.1 dB, a substantial increase in signal performance.

Figure 12:
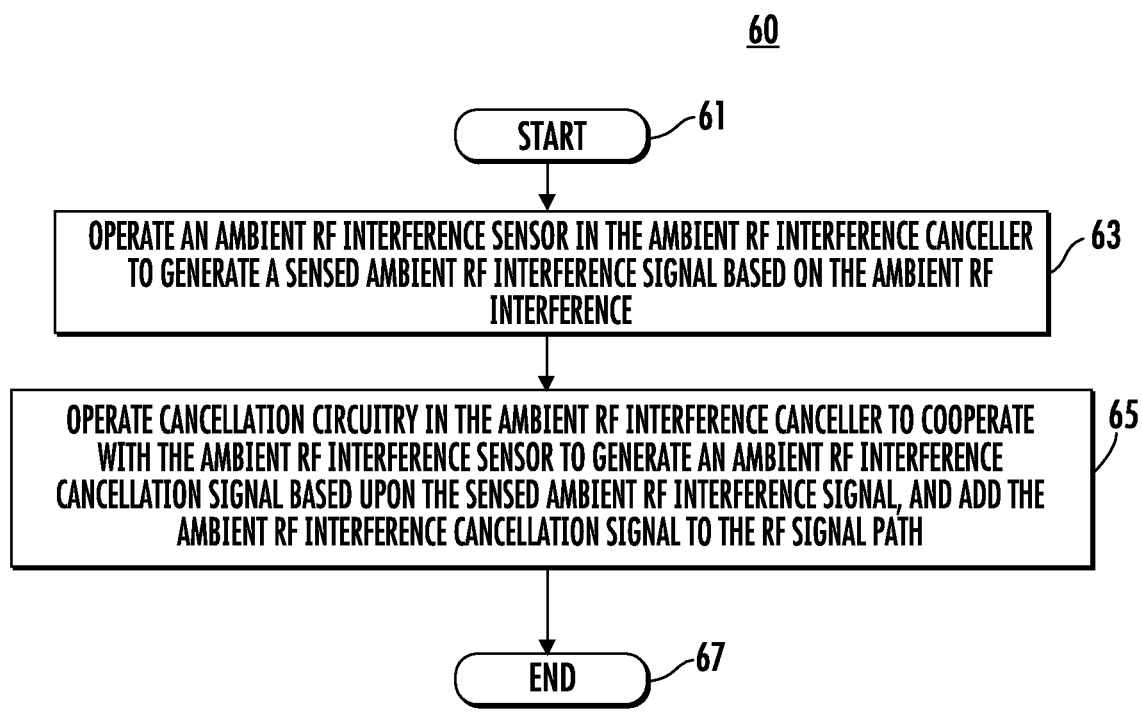
FIG. 12 is a flowchart of a method for operating a LORAN device, according to the present disclosure.

Referring briefly and additionally to FIG. 3 and a flowchart 60 (FIG. 12) therein, a method for operating a LORAN device 120 is now described. (Block 61). The LORAN device 120 includes a LORAN antenna 116, a LORAN receiver 117, an RF signal path 121a-121b extending between the LORAN antenna and the LORAN receiver and being subject to ambient RF interference, and an ambient RF interference canceller 122 coupled in the RF signal path. The method includes operating an ambient RF interference sensor 123 in the ambient RF interference canceller 122 to generate an approximation to the ambient RF interference signal based on the sensed ambient RF interference. (Block 63). The method also comprises operating cancellation circuitry 124 in the ambient RF interference canceller 122 to cooperate with the ambient RF interference sensor 123 to generate an ambient RF interference cancellation signal based upon the sensed ambient RF interference signal, and add the ambient RF interference cancellation signal to the RF signal path. (Blocks 65, 67).

Referring now additionally to FIG. 4, another embodiment of the LORAN device 220 is now described. In this embodiment of the LORAN device 220, those elements already discussed above with respect to FIG. 3 are incremented by 100 and most require no further discussion herein. This embodiment differs from the previous embodiment in that this LORAN device 220 illustratively comprises a cellular mobile device form-factor. In other words, this embodiment necessitates LORAN components on-board with other integrated components. Indeed, because of the small size of the LORAN device 220, the ambient RF interference canceller 222 is integrated with the LORAN receiver 217. Also, the LORAN device 220 comprises a plurality of RF interference generating components 218a-218b, including a processor 218a, and a display 218b (e.g. a touchscreen display).

Here, the ambient RF interference sensor comprises an ambient RF interference antenna 223a-223b (e.g. the illustrated dipole antenna with first and second antenna elements). The first antenna element of the ambient RF interference antenna 223a-223b is positioned adjacent the display 218b. The second antenna element of the ambient RF interference antenna 223a-223b is positioned adjacent the processor 218a. In some embodiments, this colocation is on-board (i.e. on the same printed circuit board), but in other embodiments, this colocation may comprise a system-on-chip (SoC) arrangement.

Figure 5:
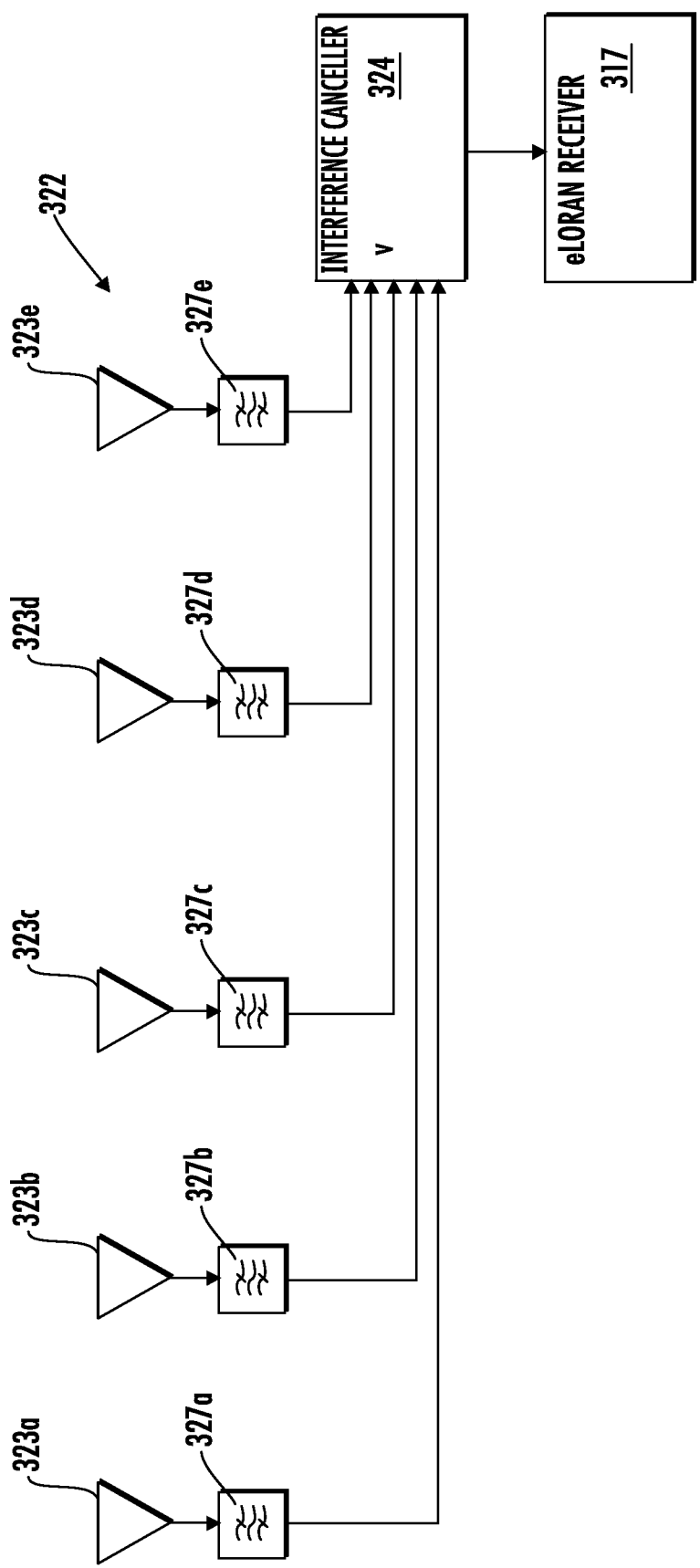
FIG. 5 is an ambient RF interference canceller, according to a third embodiment of the present disclosure.

Referring now additionally to FIG. 5, another embodiment of the LORAN device 320 is now described. In this embodiment of the LORAN device 320, those elements already discussed above with respect to FIGS. 3-4 are incremented to the 300 range and most require no further discussion herein. This embodiment differs from the previous embodiment in that the ambient RF interference canceller 322 illustratively comprises a plurality of ambient RF interference antennas 323a-323e, and a plurality of bandpass filters 327a-327n respectively coupled to the plurality of ambient RF interference antennas. Each of the plurality of ambient RF interference antennas 323a-323e is directed to a particular source of RF interference (internal and external), for example, a LORAN receive antenna, a canceller proximity interference pickup antenna (i.e. self-interference from the cancellation circuitry 324), and a set of interferer pickup antennas, and a prime power interference pickup antenna.

In particular, the plurality of bandpass filters 327a-327n are all set to the bandwidth of desired signal. For example, for eLORAN signals, this is typically a 28 kHz wide 8-pole Butterworth filter centered on 100 kHz, or a low pass filter could be used from 200 kHz and down. The interference canceller includes a summer of the complex weights, amplitude and phase one for each input signal. So, the estimated interference and the ambient interference add out of phase and interference cancellation occurs. Here, the cancellation circuitry 324 contains the inverse FIR method inside.

Also, the cancellation circuitry 324 may make unwanted self-interference. So, one of the ambient RF interference antennas 323b samples the interference generated by the cancellation circuitry 324 for feedback into the cancellation circuitry.

Figure 8:
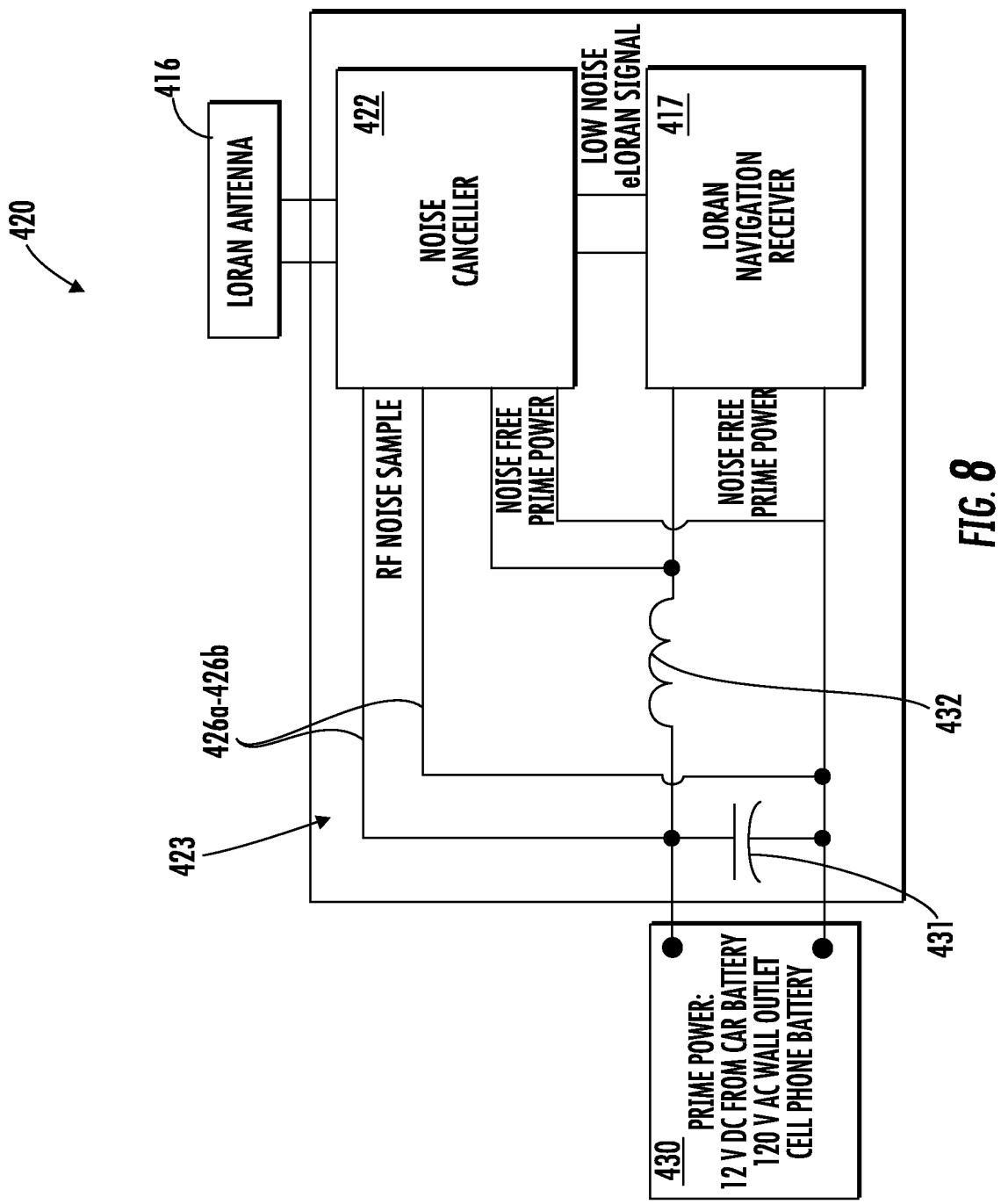
FIG. 8 is a LORAN device, according to a fourth embodiment of the present disclosure.

Referring now additionally to FIG. 8, another embodiment of the LORAN device 420 is now described. In this embodiment of the LORAN device 420, those elements already discussed above with respect to FIGS. 3-5 are incremented to the 400 range and most require no further discussion herein. This embodiment differs from the previous embodiment in that the LORAN device 420 illustratively comprises power supply lines 430 coupled to the LORAN receiver 417. In this embodiment, the ambient RF interference sensor 423 comprises a power signal sensor coupled to the power supply lines 430.

The power signal sensor illustratively includes a capacitor 431 coupled in parallel to the power supply lines 430, a resistor 432 coupled between the power supply lines and the LORAN receiver 417, and a pair of power coupling lines 426a-426b coupled between the power supply lines and the ambient RF interference canceller 422. Advantageously, the LORAN device 420 is configured to sense interference from prime power supply, and powerline fault interference from power supply sources.

Figure 9:
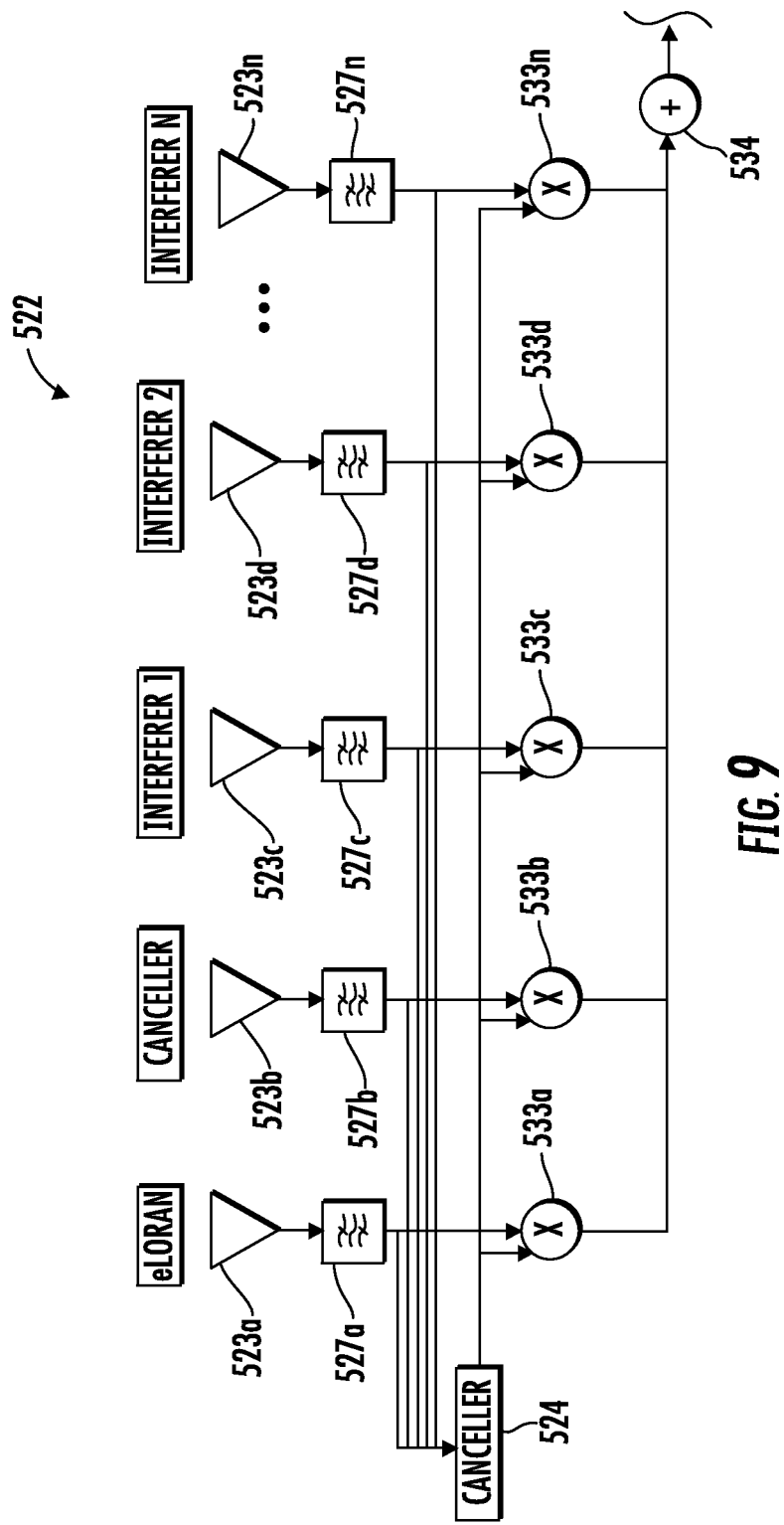
FIG. 9 is an ambient RF interference canceller, according to a fifth embodiment of the present disclosure.

Referring now additionally to FIG. 9, another embodiment of the LORAN device 520 is now described. In this embodiment of the LORAN device 520, those elements already discussed above with respect to FIGS. 3-5 & 8 are incremented to the 500 range and most require no further discussion herein. This embodiment differs from the previous embodiment in that this ambient RF interference canceller 522 illustratively comprises a plurality of ambient RF interference antennas 523a-523n, and a plurality of low pass filters 527a-527n respectively coupled to the plurality of ambient RF interference antennas. Each of the plurality of ambient RF interference antennas 523a-523n is directed to a particular source of RF interference (internal and external).

The ambient RF interference canceller 522 illustratively includes a plurality of multipliers 533a-533n coupled to the cancellation circuitry 524 and outputs from the plurality of low pass filters 527a-527n. The ambient RF interference canceller 522 comprises a summer 534 configured to sum the outputs of the plurality of multipliers 533a-533n.

As will be appreciated, the ambient RF interference canceller 522 may provide a method for calculating the covariance matrix. Based upon the operational frequency of the ambient RF interference canceller 522, at every nth clock cycle, the process includes obtaining a new sample vector v. Also at every nth clock cycle, the process includes calculating a new sample covariance matrix $R_{xx}=vv^H$. A series of M consecutive $R_{xx}$ matrices are averaged to provide a covariance matrix estimate, which is used to calculate weights, and these weights are used to properly implement interference cancellation.

Figure 10:
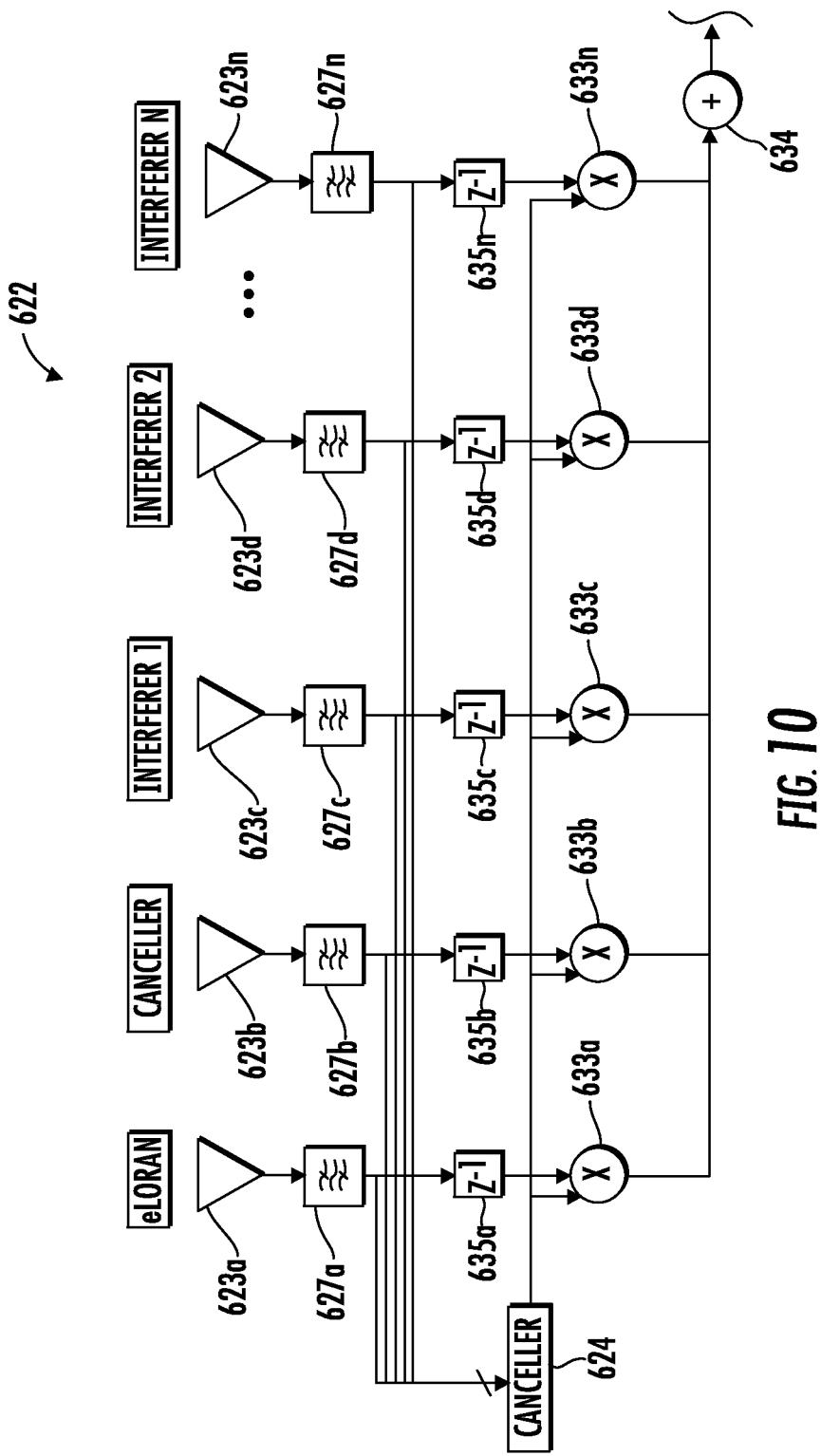
FIG. 10 is an ambient RF interference canceller, according to a sixth embodiment of the present disclosure.

Referring now additionally to FIG. 10, another embodiment of the LORAN device 620 is now described. In this embodiment of the LORAN device 620, those elements already discussed above with respect to FIGS. 3-5 & 8-9 are incremented to the 600 range and most require no further discussion herein. This embodiment differs from the previous embodiment in that this ambient RF interference canceller 622 illustratively comprises a plurality of delay blocks 635a-635n coupled downstream from the plurality of low pass filters 627a-627n. In this embodiment, the ambient RF interference canceller 622 is configured to delay the eLORAN signal by exactly the time required for the canceller to calculate the weights, thereby accounting for computational latency.

It may be beneficial to sample the RF interference without the RF interference sample containing the desired LORAN signal. Further it can be beneficial to sample the RF interference conveniently. A snap on current transformer or instrumentation transformer is contemplated as an RF interference sensor. Such current transformer sensor may be clipped on DC or AC power supply wiring.

Other features relating to eLORAN navigation and communication systems are disclosed in co-pending applications: Ser. No. 16/013,106, titled "ELORAN RECEIVER WITH FERROMAGNETIC BODY AND RELATED ANTENNAS AND METHODS,"; Ser. No. 15/980,857, "TOWER BASED ANTENNA INCLUDING MULTIPLE SETS OF ELONGATE ANTENNA ELEMENTS AND RELATED METHODS,"; titled: "LORAN DEVICE WITH ELECTRICALLY SHORT ANTENNA AND CRYSTAL RESONATOR AND RELATED METHODS"; and titled: "ELORAN RECEIVER AND ANTENNA WITH FERROMAGNETIC BODY AND WINDINGS AND RELATED METHODS", which are incorporated herein by reference in their entirety.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A LOng-RAnge Navigation (LORAN) device comprising:
    a LORAN antenna;
    a LORAN receiver for a LORAN receive signal having LORAN pulses with LORAN pulse space periods between adjacent LORAN pulses;
    a radio frequency (RF) signal path extending between said LORAN antenna and said LORAN receiver and being subject to ambient RF interference; and
    an ambient RF interference canceller coupled in said RF signal path and comprising
        an ambient RF interference sensor configured to generate a sensed ambient RF interference signal based on the ambient RF interference, and
        cancellation circuitry configured to
            cooperate with said ambient RF interference sensor to generate an ambient RF interference cancellation signal during a LORAN pulse space period by generating a plurality of channel weights for the LORAN receive signal, and a plurality of interference weights for the sensed ambient RF interference signal, and
            add the ambient RF interference cancellation signal to said RF signal path.

2. The LORAN device of claim 1 wherein said ambient RF interference sensor comprises an ambient RF interference antenna.

3. The LORAN device of claim 2 further comprising a housing containing said LORAN receiver and an RF interference generating component also contained with said housing; and wherein said ambient RF interference antenna is positioned adjacent to said RF interference generating component.

4. The LORAN device of claim 1 further comprising power supply lines coupled to said LORAN receiver; and wherein said ambient RF interference sensor comprises a power signal sensor coupled to said power supply lines.

5. The LORAN device of claim 1 wherein said cancellation circuitry is configured to generate the plurality of channel weights and the plurality of interference weights by at least generating an estimated inverse covariance matrix.

6. The LORAN device of claim 1 wherein said cancellation circuitry is configured to generate the ambient RF interference cancellation signal by at least performing an adaptive filter process.

7. The LORAN device of claim 1 wherein the sensed ambient RF interference signal includes a spectral component outside a frequency range of a LORAN receive signal.

8. The LORAN device of claim 1 further comprising a low pass filter coupled in said RF signal path.

9. The LORAN device according to claim 1, wherein the LORAN device comprises an enhanced LORAN (eLORAN) device.

10. An ambient radio frequency (RF) interference canceller device for a LOng-RAnge Navigation (LORAN) device comprising a LORAN antenna, a LORAN receiver for a LORAN receive signal having LORAN pulses with LORAN pulse space periods between adjacent LORAN pulses, an RF signal path extending between the LORAN antenna and the LORAN receiver and being subject to ambient RF interference, the ambient RF interference canceller device comprising:

an ambient RF interference sensor configured to generate a sensed ambient RF interference signal based on the ambient RF interference; and cancellation circuitry configured to cooperate with said ambient RF interference sensor to generate an ambient RF interference cancellation signal during a LORAN pulse space period by generating a plurality of channel weights for the LORAN receive signal, and a plurality of interference weights for the sensed ambient RF interference signal, and add the ambient RF interference cancellation signal to said RF signal path.

11. The ambient RF interference canceller device of claim 10 wherein said ambient RF interference sensor comprises an ambient RF interference antenna.

12. The ambient RF interference canceller device of claim 11 further comprising a housing containing the LORAN receiver and an RF interference generating component also contained with said housing; and wherein said ambient RF interference antenna is positioned adjacent said RF interference generating component.

13. The ambient RF interference canceller device of claim 10 wherein said ambient RF interference sensor comprises a power signal sensor coupled to a plurality of power supply lines.

14. The ambient RF interference canceller device of claim 10 wherein said cancellation circuitry is configured to generate the plurality of channel weights and the plurality of interference weights by at least generating an estimated inverse covariance matrix.

15. The ambient RF interference canceller device of claim 10 wherein said cancellation circuitry is configured to generate the ambient RF interference cancellation signal by at least performing an adaptive filter process.

16. A method for operating a LOng-RAnge Navigation (LORAN) device comprising a LORAN antenna, a LORAN receiver for a LORAN receive signal having LORAN pulses with LORAN pulse space periods between adjacent LORAN pulses, a radio frequency (RF) signal path extending between the LORAN antenna and the LORAN receiver and being subject to ambient RF interference, and an ambient RF interference canceller coupled in the RF signal path, the method comprising:

operating an ambient RF interference sensor in the ambient RF interference canceller to generate a sensed ambient RF interference signal based on the ambient RF interference; and operating cancellation circuitry in the ambient RF interference canceller to cooperate with the ambient RF interference sensor to generate an ambient RF interference cancellation signal during a LORAN pulse space period by generating a plurality of channel weights for the LORAN receive signal, and a plurality of interference weights for the sensed ambient RF interference signal, and add the ambient RF interference cancellation signal to the RF signal path.

17. The method of claim 16 wherein the ambient RF interference sensor comprises an ambient RF interference antenna.

18. The method of claim 16 wherein the ambient RF interference sensor comprises a power signal sensor coupled to a plurality of power supply lines.

19. The method of claim 16 further comprising operating the cancellation circuitry to generate the plurality of channel weights and the plurality of interference weights by at least generating an estimated inverse covariance matrix.

20. The method of claim 16 further comprising operating the cancellation circuitry to generate the ambient RF interference cancellation signal by at least performing an adaptive filter process.

* * * * *